US012186931B2

(12) United States Patent
Giasson

(10) Patent No.: US 12,186,931 B2
(45) Date of Patent: Jan. 7, 2025

(54) APPARATUS FOR FACILITATING LOCATION OF AN OBJECT AND A CORRESPONDING APERTURE IN A CONSTRUCTION PANEL AND METHOD OF USE

(71) Applicant: Eugene M. Giasson, Somerset, MA (US)

(72) Inventor: Eugene M. Giasson, Somerset, MA (US)

( * ) Notice: Subject to any disclaimer, the term of this patent is extended or adjusted under 35 U.S.C. 154(b) by 77 days.

(21) Appl. No.: 18/138,602

(22) Filed: Apr. 24, 2023

(65) Prior Publication Data

US 2023/0356426 A1 Nov. 9, 2023

Related U.S. Application Data

(60) Provisional application No. 63/337,817, filed on May 3, 2022.

(51) Int. Cl.
*B27B 5/12* (2006.01)
*E04C 2/52* (2006.01)

(52) U.S. Cl.
CPC ................ *B27B 5/12* (2013.01); *E04C 2/521* (2013.01)

(58) Field of Classification Search
CPC ............ B27B 5/12; E04C 2/521; B23B 51/04
See application file for complete search history.

(56) References Cited

U.S. PATENT DOCUMENTS

| | | | | |
|---|---|---|---|---|
| 1,356,019 A * | 10/1920 | See | B27B 5/12 | 408/68 |
| 1,745,779 A * | 2/1930 | Carson | B27B 5/12 | 408/703 |
| 5,782,588 A * | 7/1998 | Gardner | B23B 51/04 | 408/101 |
| 8,770,900 B1 * | 7/2014 | Schmidt | B27G 15/00 | 408/206 |
| 10,933,476 B1 * | 3/2021 | Kao | B23B 51/05 | |
| 2007/0231090 A1 * | 10/2007 | Sherry | B27B 5/12 | 408/69 |
| 2013/0309032 A1 * | 11/2013 | Waseby | B27B 5/12 | 408/72 R |
| 2017/0259351 A1 * | 9/2017 | Hsu | B23B 51/05 | |
| 2018/0043490 A1 * | 2/2018 | Johnson | B23Q 11/0046 | |
| 2019/0193173 A1 * | 6/2019 | Broekman | B23B 51/0473 | |

(Continued)

*Primary Examiner* — Omar Flores Sanchez
(74) *Attorney, Agent, or Firm* — Lawrence G. Fridman, ESQ; Feigin & Fridman, LLC

(57) ABSTRACT

The invention provides a method of locating a position of an electrical fixture behind a panel by using an aperture cutting guide comprising a support plate and a guide tube having a longitudinal aperture. The support plate is formed with first holes and second holes. The selected second hole and the guide tube protruding through a cut-out of a panel are positioned at an axis of the fixture installation location. A hole cutting tool having a longitudinal rotatable element and a cutting member with cutting teeth is directed towards the cut-out. The rotatable element is movably received and guided by the tube's longitudinal aperture. An opening within the panel is cut by the cutting teeth, so that the guide tube is adapted to retain a proper orientation of the longitudinal rotatable element and to prevent the cutting teeth of the tool from drifting away from a predetermined orientation.

11 Claims, 6 Drawing Sheets

(56) References Cited

U.S. PATENT DOCUMENTS

| | | | | |
|---|---|---|---|---|
| 2019/0358716 | A1* | 11/2019 | Ward | B23B 51/04 |
| 2020/0198067 | A1* | 6/2020 | Jiang | B28D 1/14 |
| 2023/0356306 | A1* | 11/2023 | Mateer | B23B 51/0426 |

* cited by examiner

APPARATUS FOR FACILITATING LOCATION OF AN OBJECT AND A CORRESPONDING APERTURE IN A CONSTRUCTION PANEL AND METHOD OF USE

CROSS-REFERENCE TO RELATED APPLICATIONS

This application claims the benefit of Provisional Patent Application No. 63/337,817, filed on May 3, 2022, which is incorporated in its entirety herein by reference.

FIELD OF THE INVENTION

The present invention relates in general to an apparatus and method for locating the position of an object behind a construction panel and protecting the object or any contents therein during the cutting of an aperture in the panel. In particular, the invention relates to an apparatus and method for locating a position of an electrical outlet/fixture or the like behind a construction panel and protecting related wires during cutting of an aperture in the panel to reveal said outlet.

BACKGROUND OF THE INVENTION

Typical construction methods call for installing panels of sheet rock and the like. Prior to installation of the panels electrical wiring is installed for the electrical appliances/devices. For this purpose, it is necessary to cut away sections of the panel to provide access to the electrical appliance/device. A great deal of skill is necessary to quickly and accurately conduct the necessary measurements and cut away a section panel in the precise location so that the cut away section is in exact correspondence with the electrical appliance/device upon installation of the panel. In many instances this is not done. During the electrical appliances/fixtures installation process it is important to conduct proper measurement identifying a predetermined location of an electrical appliance/device to be installed. This often requires a map of a room/space to be provided showing the predetermined location of the aperture to be drilled in the panel for the appliances to be installed. In the process of installation of electrical appliances wires are often getting lost or misplaced. When an electrician comes back to the working area for the actual installation, it is often required to remeasure the space, and to confirm previously identified locations of the wires and appliances and finding and repositioning the misplaced wires. As a result, valuable time is being lost causing delays in the installation process and extra costs to clients.

One of the major goals of the invention is to resolve the above-noted problems by utilizing an aperture cutting guide. Another object of the invention is to provide the device capable of holding the wires in the predetermined locations, so that the measurements should be taken once. When an electrician comes back to the work site for actual fixture installation through the use of the aperture cutting guide of the invention it is easier to locate previously identified locations for the installation.

SUMMARY OF THE INVENTION

One aspect of the invention provides method of locating a position of an electrical fixture behind a panel by using an aperture cutting guide, wherein the cutting guide includes a support plate and a guide tube having a longitudinal aperture passing therethrough, with the support plate being formed with multiple sets of holes extending longitudinally through a central region thereof. Each pair of holes consists of a first or large hole and a second or small hole separated from each other. The method comprising the following steps: determining a location for an electrical fixture installation and arranging orientation of selected the second or small holes of the support plate at a longitudinal axis of the predetermined fixture installation location; positioning the guide tube within the predetermined second or small hole of the support plate corresponding to location of the longitudinal axis of the fixture installation; installation of a panel having a cut-out over the guide tube so that the guide tube protrudes through the cut-out; directing a hole cutting tool having a longitudinal rotatable pilot and a cutting member with circumferentially oriented cutting teeth towards the cut-out; positioning the longitudinal rotatable pilot into the longitudinal aperture of the tube, so that upon advancement of the hole cutting tool towards the panel the pilot is movably received within and guided by the longitudinal aperture; and cutting an aperture within the panel by the circumferentially oriented cutting teeth, so that the guide tube is adapted to retain a proper orientation of the pilot and to prevent the cutting teeth of the tool from drifting away from a predetermined orientation.

Another aspect of the invention provides the method further comprises the steps of inserting electrical wires through a selected first or large hole of the plate adjacent to location of the guide tube and the step of removably attaching a distal end of the wires to the guiding tube.\

A further aspect of the invention provides the step of positioning the guide tube within the predetermined second or small hole so that a longitudinal axis of the aperture in the guide tube co-insides with the longitudinal axis of ultimate location of the electrical fixture.

As to still another aspect of the invention in the step of inserting electrical wires through the selected first or large hole the distal end of the wires is removably attached to the tube and a portion of the wires spaced from the distal end is fixedly secured to the support structure, so that the wires are prevented from undesirable movement.

As to still further aspect of the invention in the aperture cutting step the distal end of the wires wire is separated from the rotatable element by a wall of the tube and is securely positioned within a hollow interior space of a cutting tool body.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DESCRIPTION OF THE DISCLOSED TECHNOLOGY

Figure 1:
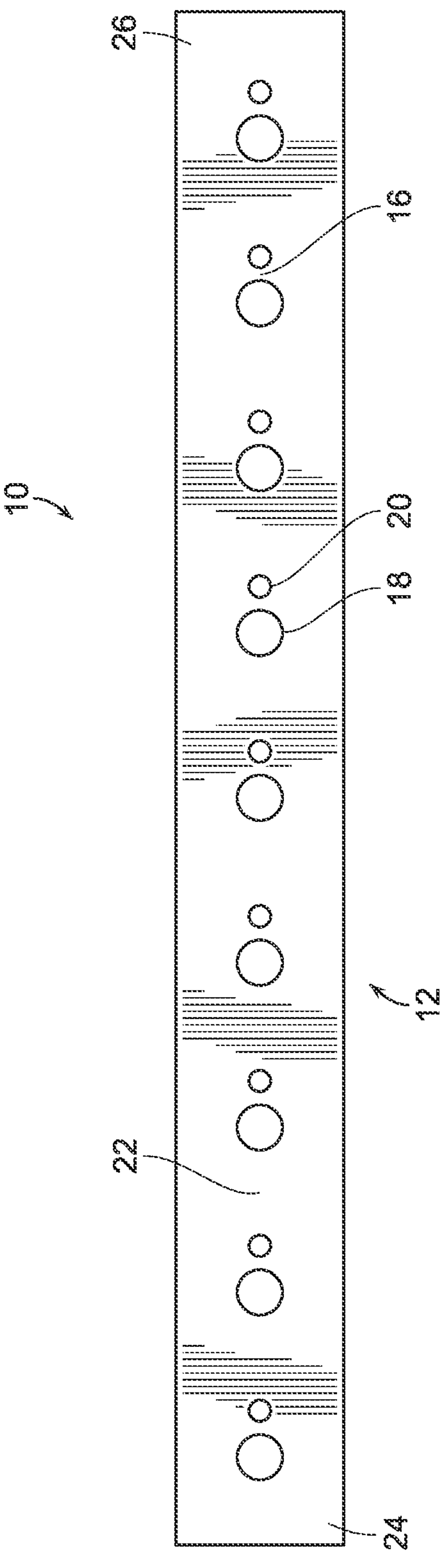
FIG. 1 shows the support plate of the apparatus of the invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

An apparatus or an aperture cutting guide 10 of the invention comprises of a support plate 12 and a guide tube 14 combination. As illustrated in FIG. 1, the support plate 12 is typically a strip of flexible, thin material with multiple sets of pair of holes 16 extending longitudinally through a central region thereof. Each pair consists of a first or large hole 18 and a second or small hole 20 separated from each other. The hole sets 16 are spaced from each other by a gap 22. In a specific embodiment the support plate can be in the form of a flat strip of a flexible and thin material. Although any conventional flexible material can be utilized, in one embodiment of the invention the plate can be made of plastic including, but not limited to, vinyl. In a more specific embodiment, the support plate 12 is a semi-rectangular strip measuring 28 inches long, 3 inches wide, and 0.035 inches thick. In one embodiment, nine sets of holes are provided, measuring approximately 0.75 inches in diameter for the large hole and approximately 0.375 inches in diameter for the small hole. In the same embodiment the hole sets 16 are separated from each other by the gap of approximately 3 inches. The main function of the small holes 20 is to accommodate and/or slidably receive the guide tube 14. The size of the small holes may be altered to accommodate the wall thickness of the guide tube best suited to a house industry-standard 0.25-inch pilot or arbor/drill. The guide tube 14 can be made of a rigid or a semi-rigid material including but not limited to, plastic. In a very specific embodiment, the guide tube is approximately 8 inches in length. A longitudinal aperture 15 extends through the entire length of the tube 14. In one embodiment of the invention an inner diameter of the longitudinal aperture 15 can be approximately 0.25 inches, intended to accommodate an industry-standard 0.25-inch pilot element without slack. The outer diameter of the tube 14 may be of any conventional size or can be anywhere between 0.30 and 0.35 inches, as long as it matches the circumference of the small hole 20 in the plate in order to ensure a snug fit. Although specific details of the apparatus or an aperture cutting guide 10 of the invention have been discussed above, it should be obvious to a person of ordinary skill in the present art that any dimensions and/or suitable materials conventional in the field of electrical fixture installation are within the scope of the invention. The support plate 12 can be oriented vertically, horizontally, or at an angle to accommodate any potential location of the boards and electrical appliances/fixtures being installed.

DESCRIPTION OF THE METHOD OF THE INVENTION

In the method of the invention the apparatus or the aperture cutting guide 10 is utilized for locating the position of an object or an electrical fixture 17 behind a panel 34 and protecting this object or any contents therein during the cutting of an aperture in the panel. In particular, the method of the invention is based on the use of the aperture cutting guide 10 for locating the position of an electrical fixture or the like behind a panel or wall board 34 and protecting any wires associated with the fixture during the cutting of the aperture in the panel to reveal the fixture.

In the method of the invention initially a location for the electrical fixture 17 installation is selected and if necessary, an axis thereof A-A being defined. This typically occurs after framing is completed and prior to panel installation. As previously discussed, multiple pair sets of holes 16 in the plate are provided to facilitate the selection of the location for fixture installation. One of the second or small holes 20 of the support plate is lined up with the axis A-A or center of the chosen fixture installation location.

Figure 2:
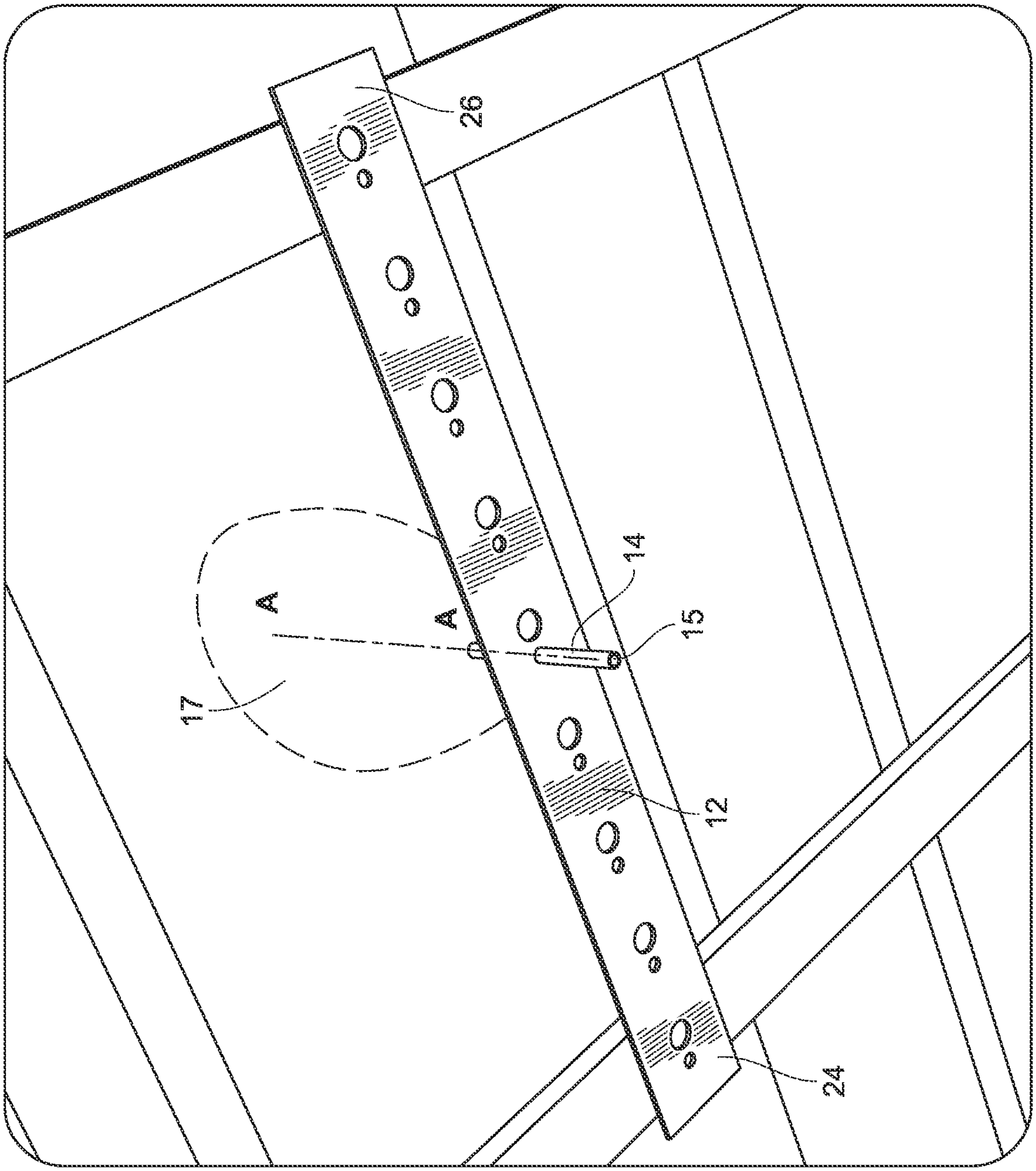
FIG. 2 shows the aperture cutting guide/tube or the apparatus of the invention attached to the support structure.
Figure 3:
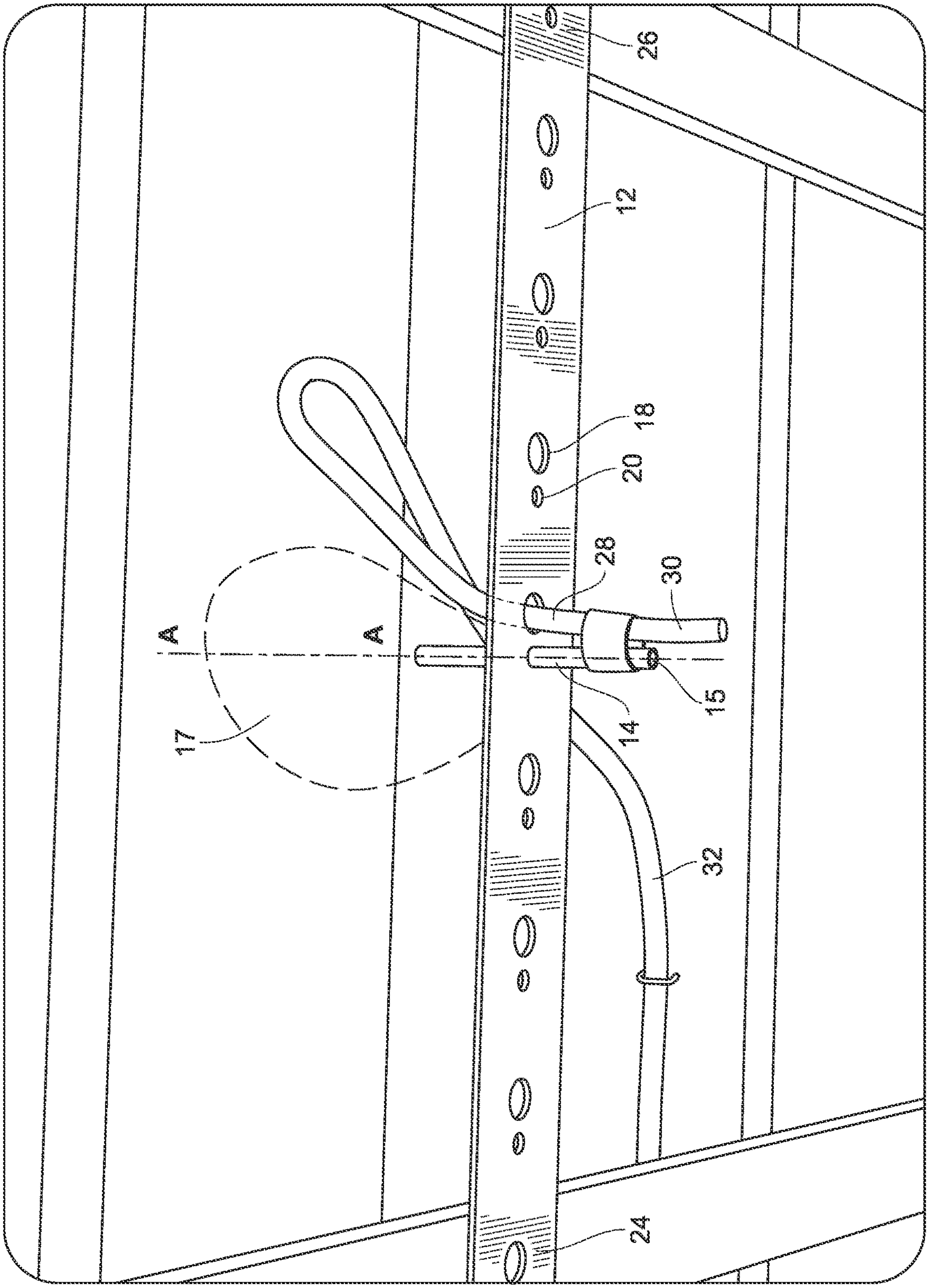
FIG. 3 shows the installed aperture cutting guide with the tube and the wires extending outwardly therefrom.

As illustrated in FIGS. 2 and 3, both ends 24, 26 of the plate 12 are secured by any conventional means to the nearest adjacent framing members. For example, screws, nails, or staples can be used for this purpose.

As illustrated in FIGS. 2 and 3 the guide tube 14 is inserted into the predetermined second or small hole 20 of the support plate, marking the location where the fixture 17 should be installed. FIG. 3 shows the plate 12 being securely fastened to the support structure and the guide tube 14 extending outwardly to identify the predetermined location for the fixture. It is essential that in the installed position a longitudinal axis of the guide tube aperture 15 corresponds to or co-insides with the ultimate location or the axis A-A of the electrical fixture. After this step the guide tube 14 is located where it is needed for further installation steps.

In the next step of the method, as also illustrated in FIG. 3, electrical wires 28 are inserted through the selected first or large hole 18 of the plate adjacent to the location of the guide tube 14. A distal end 30 of the wires 28 is removably attached to the tube 14 and a portion of the wires 32 spaced from the distal end 30 is fixedly secured in any conventional way to the support structure. Thus, the wires are prevented from undesirable movement and the apparatus 10 is ready for the board installation. This is a final preparatory step, thereafter an electrician is ready to proceed further with the essential installation steps of the method.

Figure 4:
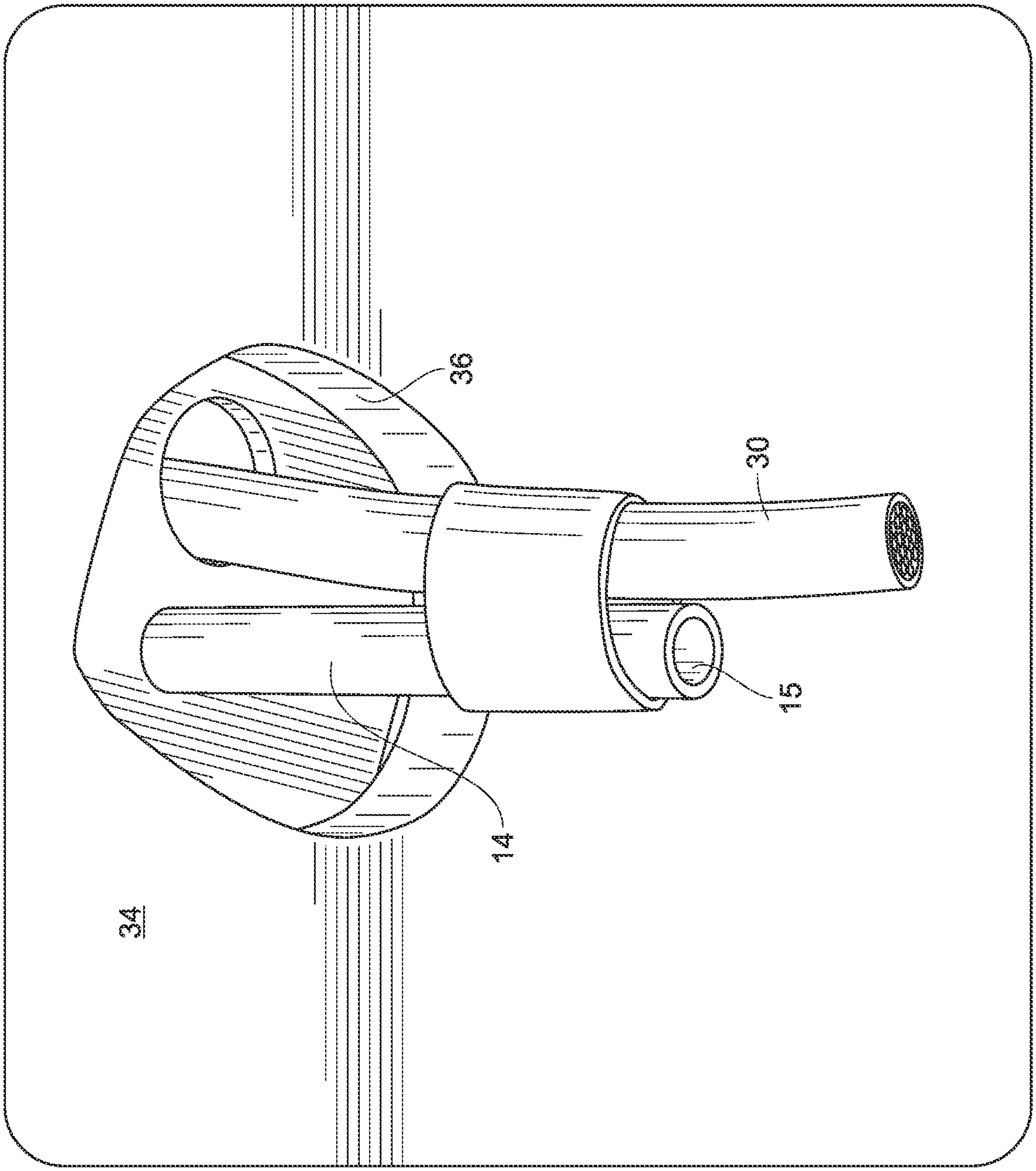
FIG. 4 shows installed panel or wall board with the tube and wires extending through a cut-out.

As illustrated in FIG. 4, in the next step of the method a panel or wallboard 34 is installed over the aperture cutting guide 10. A small cut-out 36 is formed within the panel corresponding to the location of the guide tube and wires. As the panel is installed, the guide tube 14 and the distal end 30 of the wires, removably attached to the tube, protrude through a cut-out 36. Guide 10 is applicable for the construction boards of any conventional material such as: plaster, wood, metal, etc.

Figure 5:
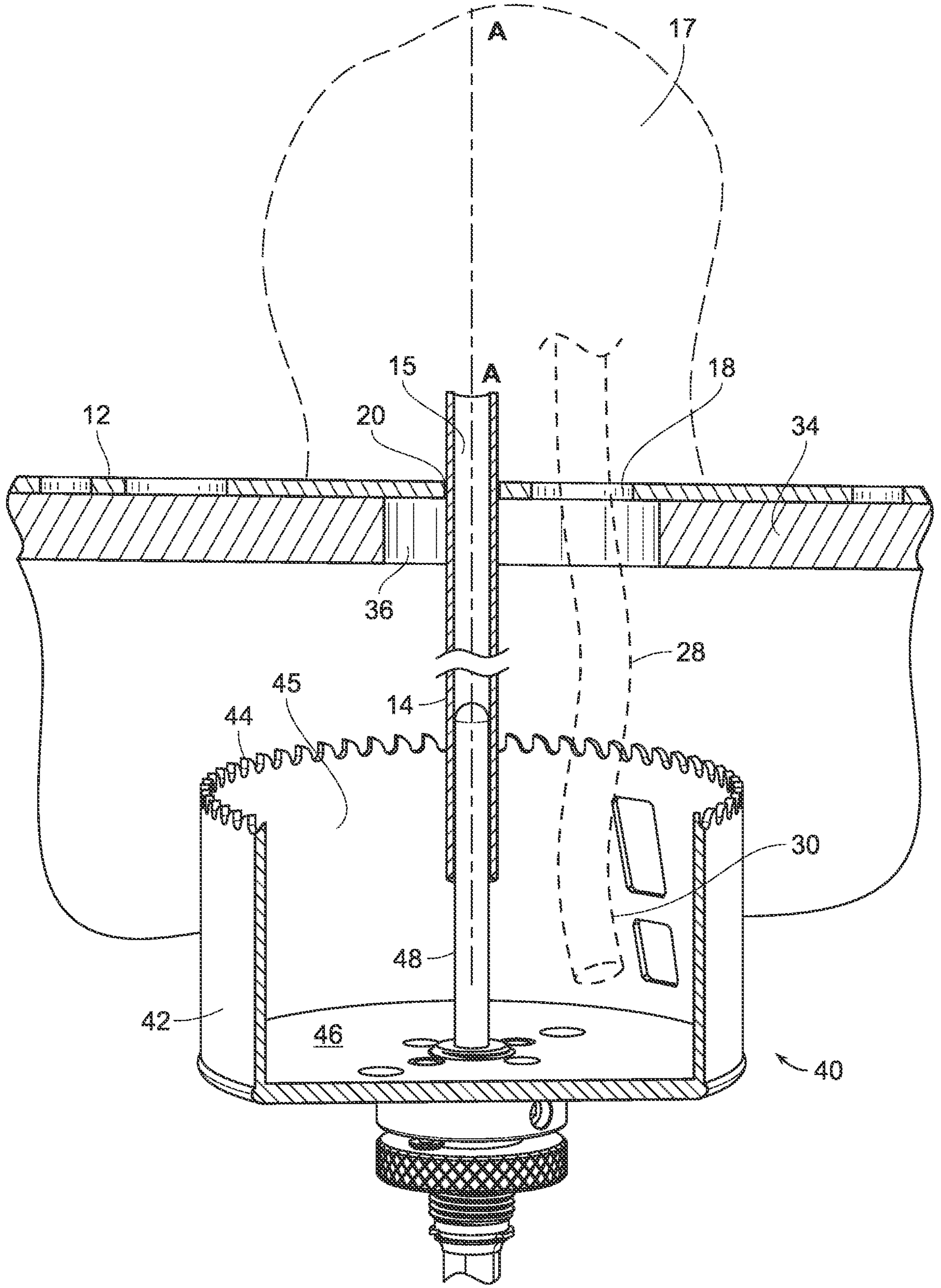
FIG. 5 illustrates an initial phase of a panel aperture cutting step of the method of the invention with a pilot element being guided by the tube aperture.
Figure 6:
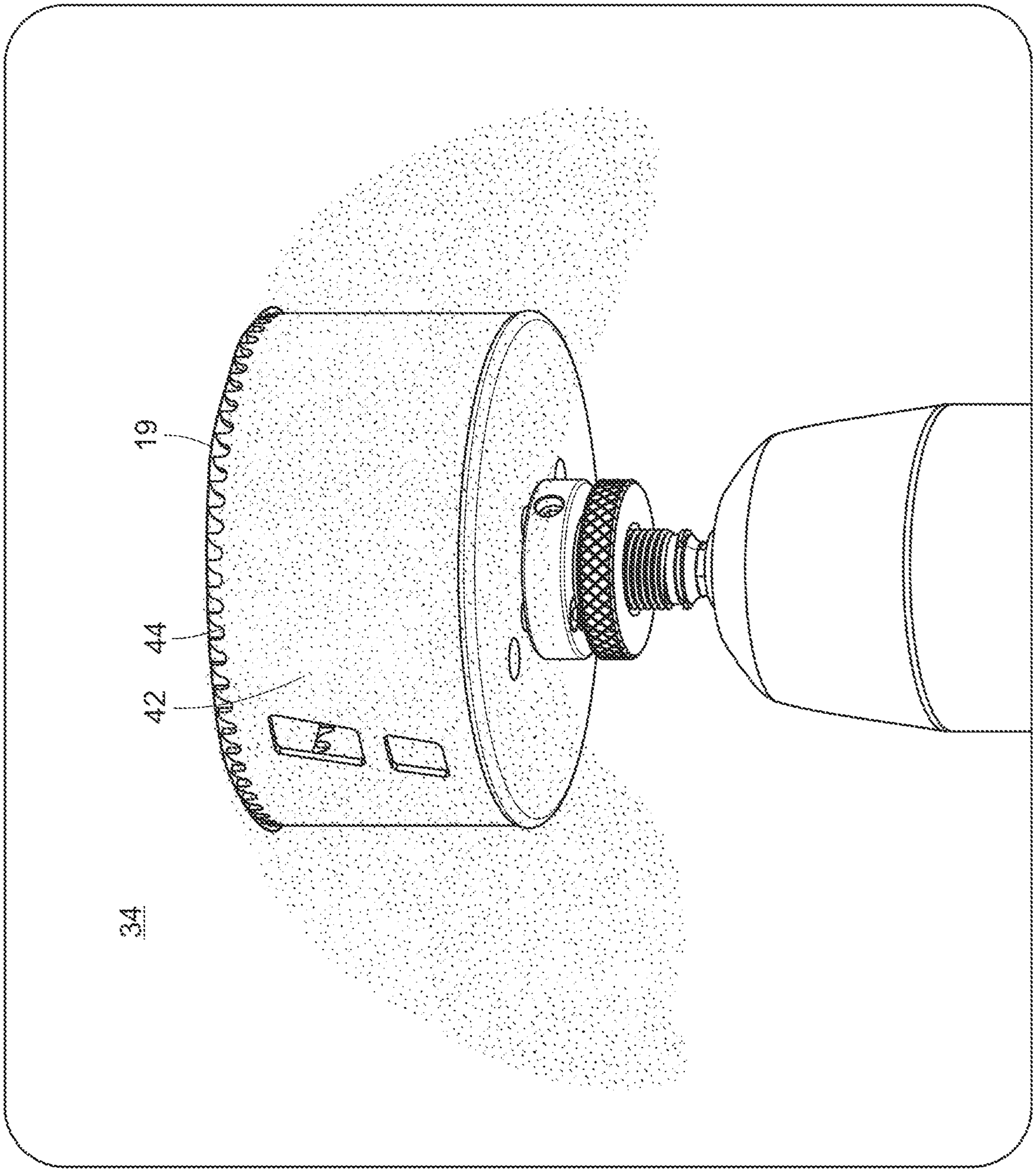
FIG. 6 illustrates further orientation of the hole cutting tool in the method of the invention when aperture in the panel is being cut.

Further steps of the method require selection of a hole cutting tool 40 having a longitudinal rotatable pilot element and a cutting member having circumferentially oriented cutting teeth. As illustrated in FIGS. 5 and 6, the hole cutting tool 40 comprises a hollow cylindrical body 42 with inner walls 45 and having cutting teeth 44 circumferentially arranged at an open exterior end thereof. A base is provided within the body 42 interior. A pilot element 48 longitudinally extends from the base to be positioned centrally within the hollow cylindrical body 42 and is spaced from inner wall 45 of the body 42. The pilot element 48 is arranged for rotation with the body 42. It will be discussed later in the application that the longitudinally extending rotatable pilot element 48 is used to stead the hole cutting process when the cutting tool is in action.

To proceed further, as best illustrated in FIG. 5, the distal end of the wires 30 is detached from the guide tube (by removing the tape for example) and the hole cutting tool 40 is directed towards the cut-out 36. At that time the distal end 30 of the wires is placed into the hollow space 46 of the hole cutting tool cylindrical body 42, just enough to protect the wires from damage by the hole cutting tool without losing the wires altogether.

FIG. 5 illustrates the initial position of the features of the invention for the drilling step when the guide tube 14 is vertically oriented. The distal end 30 of the wires is released from the tube 14 and the pilot element 48 is placed within the tube aperture 15. When the longitudinal rotatable pilot element 48 is pushed within the tube aperture 15, the wires are safe and not damaged. In the drilling process the distal end 30 of wires is separated from the pilot 48 by the walls of the tube 14 and is positioned within the hollow interior space 46 of the cutting tool body. Thus, one area of the wires is supported by the first or large hole 18 in the plate and the distal end 30 of the wires is spaced from and securely disposed in the hollow space of the cutting tool. In actuality, the wires are located within a safe zone of the hollow space 46 in the interior region of the body 42 and are protected from being damaged in the ultimate opening 19 cutting process. Upon further advancement of the cutting tool the longitudinal rotatable pilot element 48 is guided by the longitudinal aperture 15 of the guide tube 14.

In the method of the invention in the cutting step the cutting tool 40 is led the way and oriented by the pilot element 48 guided by the aperture. 15 of the guide tube 14 and is then followed by the cutting teeth 44. Because the pilot element 48 while being advanced toward the board 34 is guided by the tube aperture 15, which coincides with the axis A-A of the fixture 17, it creates a stable environment for the rest of the tool to cut through the board 34 material without drifting to form the accurate aperture 19 in the board. Since the pilot element 48 is an integral part of the cutting tool, it is rigid and will run with true circularity. The pilot element 48-guide tube 14 combination ensures that the precise location and accuracy are maintained throughout the board aperture 19 cutting process. The result is the clean aperture 19 precisely formed at the initially identified longitudinal axis A-A of the fixture 17 positioned behind the board/panel 34. As shown in FIGS. 5 and 6 while the aperture 19 within the panel/board is cut by the cutting teeth 44, the guide tube 14 facilitates retaining of the proper orientation of the pilot element 48 and prevents the tool from drifting away from the proper orientation. Since the pilot 48 only passes though the longitudinal aperture 15 of the tube, without being involved in actual drilling, wear and tear to the longitudinal rotatable pilot element 48 is reduced prolonging service life of the cutting tool. As previously discussed, another important advantage of the invention is that since the longitudinal rotatable pilot element 48 is contained/isolated within the walls of the tube guide tube aperture 15 damage to the wires is minimized during the installation process.

The longitudinal rotatable pilot element 48 guided by the tube interior aperture 15 is moved/delivered to the plate. To facilitate rotation of the longitudinal rotatable pilot element 48 without damage to the tube material within the longitudinal tube aperture 15 it is designed to fit rotation with clearance between. Thus, the aperture 19, which is being cut within the board structure by the cutting teeth 44 of the cutting tool cylindrical body 42 has the exact initially predetermined location.

In the next step (see FIG. 6) of the method the cylindrical body 42 having cutting teeth 44 of is moved longitudinally towards the board/panel where the aperture 19 is being cut. The body 42 in its rotational movement engages the panel 34 and the longitudinal movement of the cutting tool is guided by the longitudinal rotatable element 48 rotating within the longitudinal tube aperture 15. In this manner, a very specific aperture 19 in the panel/board is being cut precisely at the predetermined location. During the longitudinal advancement of the cutting tool the guiding plate 12 is being cut and discarded. On the other hand, the guide tube 14 can be removed from the respective small opening 20 in the plate and utilized for a future use in another aperture cutting operation.

An inherent problem with the cutting tool operation is that they often tend to drift sideways when drilling, especially in softer materials like drywall, causing irregular and/or off-center apertures that sometimes need to be patched or repaired. In the method of the invention the guide 10 securely guides the tool, keeping it in place in the cutting process, to ensure that the appropriate aperture 19 is cut within the board/panel. This ultimately prevents unnecessary repairs to the panel.

In the final step of the method of the invention the hole cutting tool 40 is pulled out and the debris are removed from the developed aperture 19 and the inner space 46. The guide tube 14 can be removed from the plate 12 saved for future use.

Since the cutting guide 10 can accommodate various diameters of the body 42, any diameter of ultimate aperture 19 can be chosen until the very end of the cutting process. Thus, if a customer changes his mind regarding the size/diameter of the aperture 19, this can be accommodated up to the final moment by substituting one hole cutting tool for another.

One of the essential goals of the invention is to identify and confirm the location of the aperture to be drilled/cut in the wall board for the forthcoming wire and appliances installation. As a result, the wires are installed in the exact previously determined locations with minimum requirements for corrections, remeasuring, etc.

The following list represents essential advantages of the invention over the prior art:

1. The apparatus and method of the invention can be used in construction processes with multiple mediums.
2. The invention seamlessly marks the location of the fixture installations early in the construction process.
3. Utilization of the apparatus and method of the invention prevents the need to re-measure the location of installations after panel is installed.
4. Wires are prevented from being lost, moved, or damaged during installation of insulation and panels. Application of the apparatus and method of the invention eliminates the need to make unnecessary aperture searching for wires lost in insulation and wall boarding processes, which would need to be patched and repainted, saving time and money on the construction site.
5. The guide tube eliminates the need for the pilot to drill an aperture. When the pilot is inserted into the interior of the guide tube, it guides the tool without deviating from the longitudinal axis of the tube, which coincides with the longitudinal axis A-A of the fixture. This is especially so since no actual drilling by the pilot is performed. This extends the life span of the pilot and the cutting tool significantly.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of locating a position of an electrical fixture behind a panel by using an aperture cutting guide, said cutting guide comprising a support plate and a guide tube having a longitudinal aperture passing therethrough, the support plate formed as a strip of flexible material provided with multiple sets of holes extending longitudinally through a central region thereof, each said pair consists of a first or large hole and a second or small hole separated from each other, said hole sets are spaced from each other; wherein said method comprising the following steps:

determining a location for an electrical fixture installation and arranging orientation of selected said second or small hole of the support plate corresponding to a longitudinal axis of the predetermined fixture installation location;

securing said support plate to a support structure;

positioning said guide tube within the predetermined second or small hole of the support plate corresponding to location of the longitudinal axis of the fixture installation;

installation of a panel having a cut-out over the guide tube so that the guide tube protrudes through the cut-out;

directing a hole cutting tool having a longitudinally rotatable pilot and a cutting member with circumferentially oriented cutting teeth towards the cut-out;

positioning the pilot of the hole cutting tool into the longitudinal aperture of the tube, so that upon advancement of the hole cutting tool towards the panel the pilot is movably received within and guided by said longitudinal aperture; and cutting an aperture within the panel by said circumferentially oriented cutting teeth, so that the guide tube is adapted to retain a proper orientation of the pilot and to prevent the cutting teeth of the tool from drifting away from a predetermined orientation.

2. The method of claim 1, further comprising the step of inserting electrical wires through a selected first or large hole of the plate adjacent to location of the guide tube.

3. The method of claim 2, further comprising the step of removably attaching a distal end of the wires to the guiding tube.

4. The method of claim 1, wherein said hole cutting tool is a hole saw.

5. The method of claim 1, wherein a center of the board aperture coincides with the longitudinal axis on the electrical fixture.

6. The method of claim 2, wherein in said step of inserting electrical wires through the selected first or large hole the distal end of the wires is removably attached to the tube and a portion of the wires spaced from the distal end is fixedly secured to the support structure, so that the wires are prevented from undesirable movement.

7. The method of claim 2, wherein in said aperture cutting step the distal end of the wires wire is separated from the pilot by a wall of the tube and is securely positioned within a hollow interior space of a cutting tool body.

8. A method of locating a position of an electrical fixture behind a panel by using an aperture cutting guide, said cutting guide comprising a support plate and a guide tube having a longitudinal aperture passing therethrough, the support plate provided with multiple sets of holes extending longitudinally through a central region thereof, each said pair consists of a first or large hole and a second or small hole separated from each other, said hole sets are spaced from each other by a gap; wherein said method comprising the following steps:

determining a location for an electrical fixture installation and arranging orientation of selected said second or small holes of the support plate at a longitudinal axis of the predetermined fixture installation location;

securing said support plate to a support structure;

positioning said guide tube within the predetermined second or small hole of the support plate corresponding to location of the longitudinal axis of the fixture installation;

inserting electrical wires through a selected first or large hole of the plate adjacent to location of the guide tube, and removably attaching a distal end of the wires to the guiding tube;

installation of a panel having a cut-out over the guide tube so that the guide tube protrudes through the cut-out;

directing a hole cutting tool having a longitudinal rotatable pilot and a cutting member having circumferentially oriented cutting teeth towards the cut-out;

positioning the longitudinal rotatable pilot of the cutting tool into the longitudinal aperture of the tube, so that upon advancement of the hole cutting tool towards the panel the longitudinal rotatable pilot is movably received within and guided by said longitudinal aperture; and cutting an aperture within the panel by said circumferentially oriented cutting teeth, so that the guide tube is adapted to retain a proper orientation of the longitudinal rotatable pilot and to prevent the cutting teeth of the tool from drifting away from a predetermined orientation.

9. The method of claim 8, wherein said hole cutting tool is a hole saw.

10. The method of claim 8, wherein in said step of inserting electrical wires through the selected first or large hole the distal end of the wires is removably attached to the tube and a portion of the wires spaced from the distal end is fixedly secured to the support structure, so that the wires are prevented from undesirable movement.

11. The method of claim 8, wherein in said aperture cutting step the distal end of the wires wire is separated from the pilot by a wall of the tube and is securely positioned within a hollow interior space of a cutting tool body.

* * * * *